(12) United States Patent
Wojczyk, Jr.

(10) Patent No.: US 10,249,053 B2
(45) Date of Patent: Apr. 2, 2019

(54) METHOD AND APPARATUS FOR RAPID SCANNING OF A THREE DIMENSIONAL SURFACE

(71) Applicant: The Boeing Company, Chicago, IL (US)

(72) Inventor: William E. Wojczyk, Jr., O'Fallon, MO (US)

(73) Assignee: THE BOEING COMPANY, Chicago, IL (US)

( * ) Notice: Subject to any disclaimer, the term of this patent is extended or adjusted under 35 U.S.C. 154(b) by 209 days.

(21) Appl. No.: 15/228,997

(22) Filed: Aug. 4, 2016

(65) Prior Publication Data

US 2018/0040159 A1 Feb. 8, 2018

(51) Int. Cl.
| | | |
|---|---|---|
| *G06T 7/60* | (2017.01) | |
| *G06T 19/00* | (2011.01) | |
| *H04N 13/20* | (2018.01) | |
| *G06T 7/00* | (2017.01) | |

(52) U.S. Cl.
CPC .............. *G06T 7/60* (2013.01); *G06T 7/0085* (2013.01); *G06T 19/00* (2013.01); *H04N 13/20* (2018.05)

(58) Field of Classification Search
CPC ...... G06T 17/20; G06T 2200/04; H04N 13/02
USPC .......................................................... 348/46
See application file for complete search history.

(56) References Cited

U.S. PATENT DOCUMENTS 6,342,886 B1 * 1/2002 Pfister ..................... G06T 13/20
345/419
2005/0018901 A1 * 1/2005 Kaufmann .............. G06T 17/20
382/154
2005/0019732 A1 * 1/2005 Kaufmann ................ A61C 7/00
433/213
2009/0316966 A1 * 12/2009 Marshall ............... A61B 6/5217
382/128
2014/0098090 A1 * 4/2014 Schmidt .................. G06T 17/20
345/419
2015/0009214 A1 * 1/2015 Lee ......................... G06T 17/10
345/420

(Continued)

OTHER PUBLICATIONS

Kriegel, S., et al., "A Surface-Based Next-Best-View Approach for Automated 3D Model Completion of Unknown Objects", 2011 IEEE Int'l Conference on Robotics and Automation, Shanghai Int'l Conference Center, May 9-13, 2011, Shanghai, China, pp. 4869-4874.

(Continued)

*Primary Examiner* — Marnie A Matt
(74) *Attorney, Agent, or Firm* — Gates & Cooper LLP

(57) ABSTRACT

A system and method for scanning a three-dimensional surface is disclosed. In one example, the method is evidenced by receiving scan data of the three dimensional surface, the scan data comprising a plurality of scan points defining a plurality of polygons and obtained from a scan direction, grouping the plurality of polygons into blotches having at least one polygon, wherein no polygon of a blotch shares a common edge with a polygon of any other blotch, computing a directional vector for each blotch, the directional vector of each blotch weighted by an area of the blotch, computing a further scan direction from the directional vectors for the blotches and commanding a scanner to scan from the further scan direction.

20 Claims, 10 Drawing Sheets

(56) References Cited

U.S. PATENT DOCUMENTS

2016/0005167 A1* 1/2016 Shibahara ............ A61B 6/5217
                                                    382/131
2016/0284045 A1* 9/2016 Laidig ........................ G06T 1/20
2017/0032568 A1* 2/2017 Gharpure ................ G06T 17/00

OTHER PUBLICATIONS

Kriegel, S., et al., "Next-Best-Scan Planning for Autonomous 3D Modeling", 2012 IEEE/RSJ Int'l Conference on Intelligent Robots and Systems, Oct. 7-12, 2012, Vilamoura, Algarve, Portugal, pp. 2850-2856.

* cited by examiner

METHOD AND APPARATUS FOR RAPID SCANNING OF A THREE DIMENSIONAL SURFACE

BACKGROUND

1. Field

The present disclosure relates to systems and methods for scanning surfaces, and in particular to a system and method for rapidly and accurately scanning three dimensional surfaces.

2. Description of the Related Art

It is known to be advantageous to scan three dimensional surfaces. Such scanning provides data about objects that can be used create digital representations of the objects. Such three-dimensional digital representations have use in computer automated design (CAD) and manufacture (CAM).

Such scanning (for example, as a part of a reverse engineering process of an airplane part or object) can be expensive and time consuming. Currently, such processes involve a metrology engineer meticulously aligning camera and scanning equipment with the physical part object in such a way that the best data is retrieved on each scan in order to minimize effort of the task. However, the placement of the camera/scanning equipment and the aligning techniques are subjective and takes practice to understand the best methods. If the part is not aligned properly (a common occurrence), the part needs to be reoriented and the scan repeated. Even then, the amount of time required to analyze the existing data and perform the manual adjustments is greater than necessary and increases cost.

What is needed is a method and apparatus for automatically and rapidly scanning three dimensional surfaces without user intervention. Such a method and apparatus is described below.

SUMMARY

To address the requirements described above, this document discloses a system and method for scanning a three-dimensional surface. In one embodiment, the method is evidenced by receiving scan data of the three dimensional surface, the scan data comprising a plurality of scan points defining a plurality of polygons and obtained from a scan direction, grouping the plurality of polygons into blotches having least one polygon, wherein no polygon of a blotch shares a common edge with a polygon of any other blotch, computing a directional vector for each blotch, the directional vector of each blotch weighted by an area of the blotch, computing a further scan direction from the directional vectors for the blotches and commanding a scanner to scan from the further scan direction. Another embodiment is evidenced by an apparatus having a processor and a communicatively coupled memory storing processor instructions for performing the foregoing operations. In one embodiment, the apparatus includes a sensor.

As described below, the foregoing technique finds an optimal line of sight direction vector for subsequent scans of parts with unknown three-dimensional surfaces. This technique can be utilized alone with visual displays to allows engineers to manually make adjustments and decrease the amount of time and experience needed, but utilization of a robot or other physical automation can completely remove the engineer from the process, and a fully scanned model of the aircraft part can be obtained quickly without any pre-programming of path data or knowledge of the surface of the part. The technique uses the collection of scan data for the part, and determines the best position and direction for adding more scan data to the model. Every time new data is added to the scanned model, a recalculation is performed and a new positional and directional vector is determined. The process is repeated until and end condition representing a sufficiently scanned part is achieved. These calculated vectors are
input to a robot or group of robots that operate either the aircraft part and/or the scanning equipment to fully automate the collection of the three-dimensional scan data.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

Previous scan techniques provide for the autonomous scanning of three dimensional parts using the next best scan (NBS) and next best view (NBV) methods. Such techniques are described in "Next-Best-Scan Planning for Autonomous 3D Modeling" by Simon Kriegel et al, 2012 IEEE/RSJ International Conference on Intelligent Robots and Systems, Oct. 7-12, 2012 and "A Surface-Based Next-Best-View Approach for Automated 3D Model Completion of Unknown Objects," By Simon Kriegel et al., 2011 IEEE International Conference on Robotics and Automation, May 9-13, 2011, both of which are hereby incorporated by reference herein.

Both NBS and NBV methods determine their next scan of the object based on previously scanned section of the object. The NBV method determines a scan path based on the surface trends of a boundary region on a part. Subsequent scans are selected based on the scanning object's position in the initial sensor field of view. While effective, the NBV method is known to perform poorly on parts with multiple concave areas. The NBS method is similar to the NBV method in that the scanning is based on boundary conditions. It differs from the NBV method in that subsequent scans are not based on the position of the part relative to the sensor. Rather, the subsequent scan is based on the amount of data already collected in previous scans (i.e. the largest data holes are addressed first).

Both of the foregoing techniques rely on boundary conditions to determine subsequent scans, and boundary conditions often do not provide sufficient information to define the optimal next scan direction. Typically, when scanning unknown surfaces using NBS and NBV techniques, the next computed scan direction follows edges of scanned areas to identify unscanned areas, and is minimally displaced from the previous scan direction. As a consequence, scans take longer (since less new data is presented in each scan). Further, since the total scan of the object is created by stitching together each scan from a new direction and there is error associated with each stitching operation, the NBS and NBV operations result in less accurate scans.

Unlike the NBS and NBV, the process described below does not rely on boundary conditions to determine subsequent scan directions. Instead, it uses the mesh density of an area (referred to as "blotches") to determine scan sequences. The use of mesh density offers greater efficiency and more rapid completion of the scanning of the object, and less error induced into the can data.

Scanning System

Figure 1:
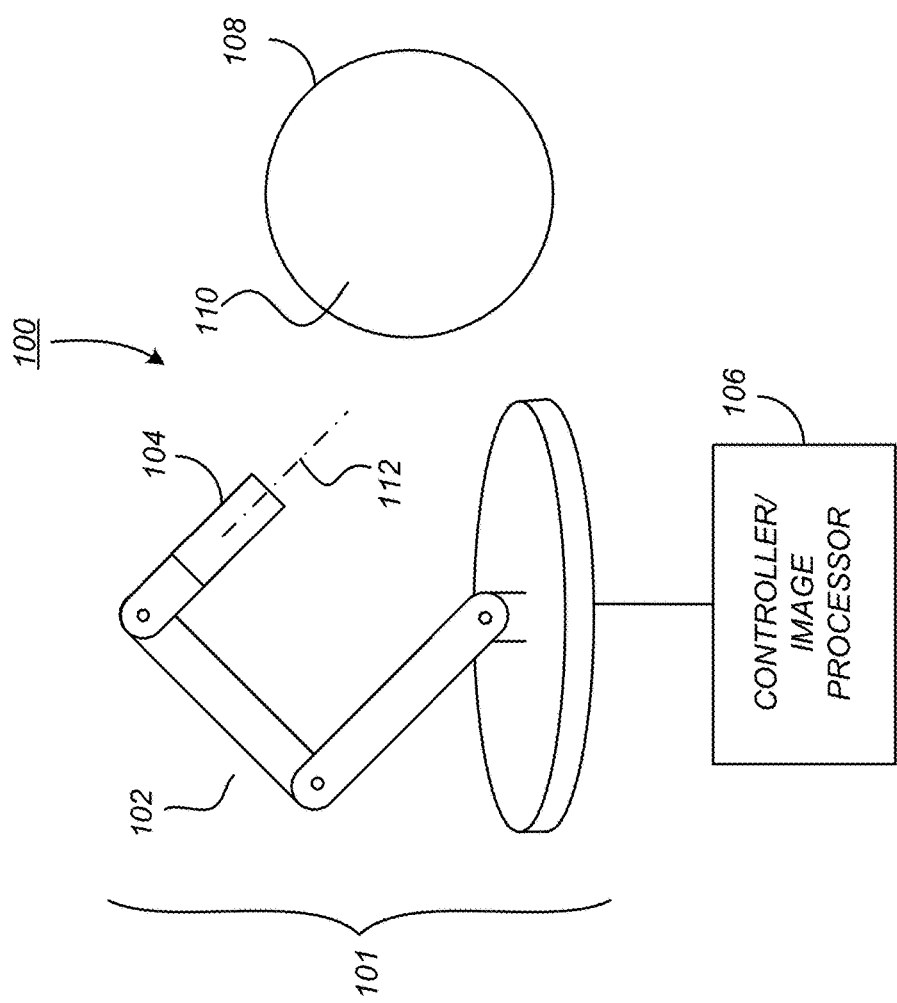
FIG. 1 is a simplified diagram of a scanning system.

FIG. 1 is a simplified diagram of a scanning system 100. The scanning system comprises a scanner 101 having a sensor 104 and a sensor orienting device 102 to orient the sensor in different scan directions to scan a three dimensional surface of the target object 108. In one embodiment, the sensor 104 is a camera operating in visual wavelengths, but the sensor 104 may be any manner of sensor used to map a 3D surface 110 of the target object 108. The sensor orienting device 102 may be a robot arm (depicted) with limbs that rotate in order to place the sensor 104 at any point and at any attitude in three dimensional space. Other sensor orienting device 102 embodiments may use a track providing lateral motion of the sensor 104 in three orthogonal directions (and a means to orient the sensor 104 at any attitude. Although described as permitting a full six degrees of freedom (6DOF) in orienting the camera, some embodiments may permit only 5DOF or 4DOF capability. However, such scanning systems 100 may take advantage of target object 108 symmetries to permit the entire target object 108 to be scanned.

Figure 2:
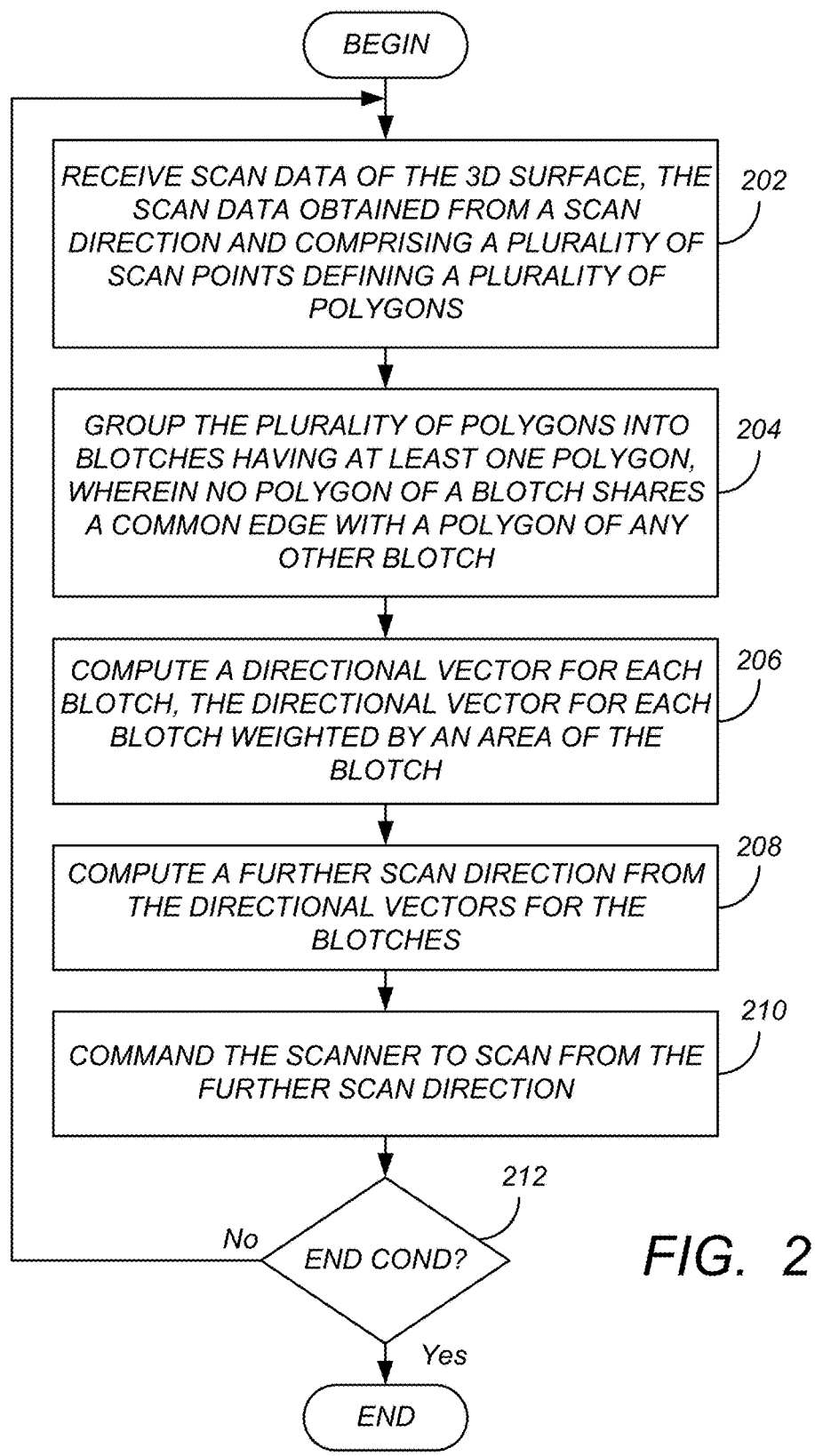
FIG. 2 is a diagram depicting one embodiment of operations that can be used to scan a three dimensional surface.

FIG. 2 is a diagram depicting one embodiment of operations that can be used to scan a three dimensional surface. In block 202, the 3D surface of the target object 108 is scanned to produce scan data. The scan data is obtained from a first scan direction (e.g. orientation of the center or boresight 112 of the field of view of the sensor).

Figure 3:
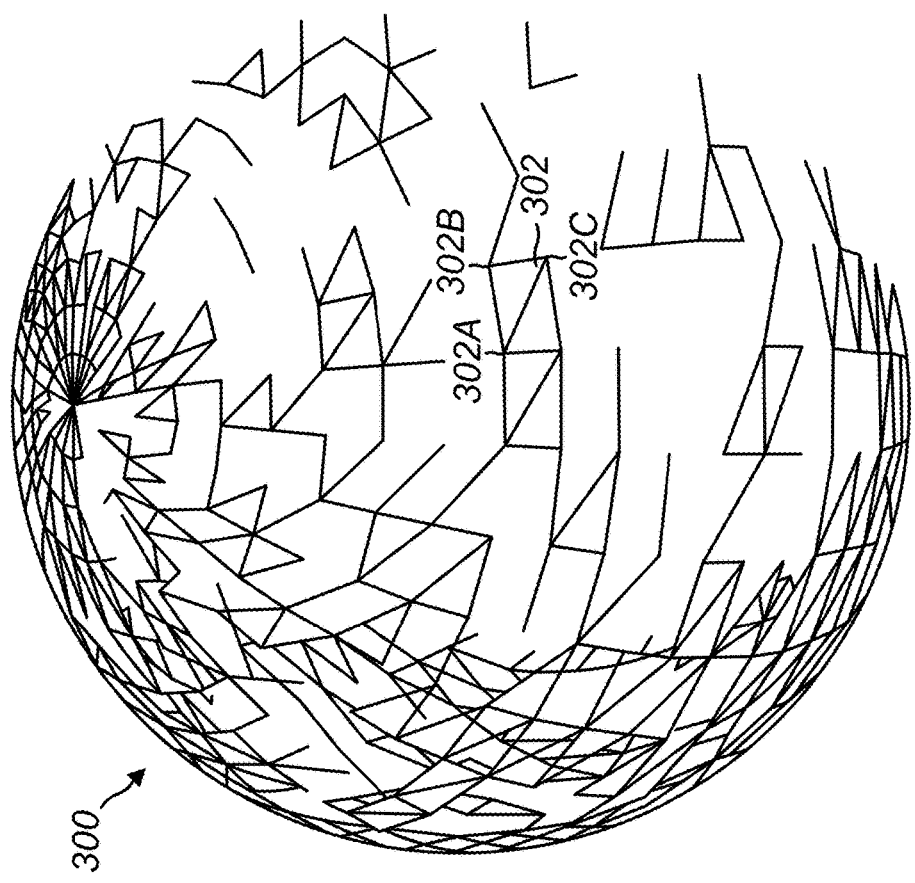
FIG. 3 is a diagram illustrating an embodiment of the scan data resulting of the scan process.

FIG. 3 is a diagram illustrating an embodiment of the scan data resulting of the scan process of block 202. Referring first to FIG. 3A, the scan data 300 comprises a plurality of scan points defining a plurality of polygons. For example, in the illustrated embodiment, the scan data 300 includes scan points 302A-302C, which define polygon 302. In block 204, the plurality of polygons is grouped into blotches having at least one polygon, wherein no polygon of a blotch shares a common edge with a polygon of any other blotch.

Figure 4A:
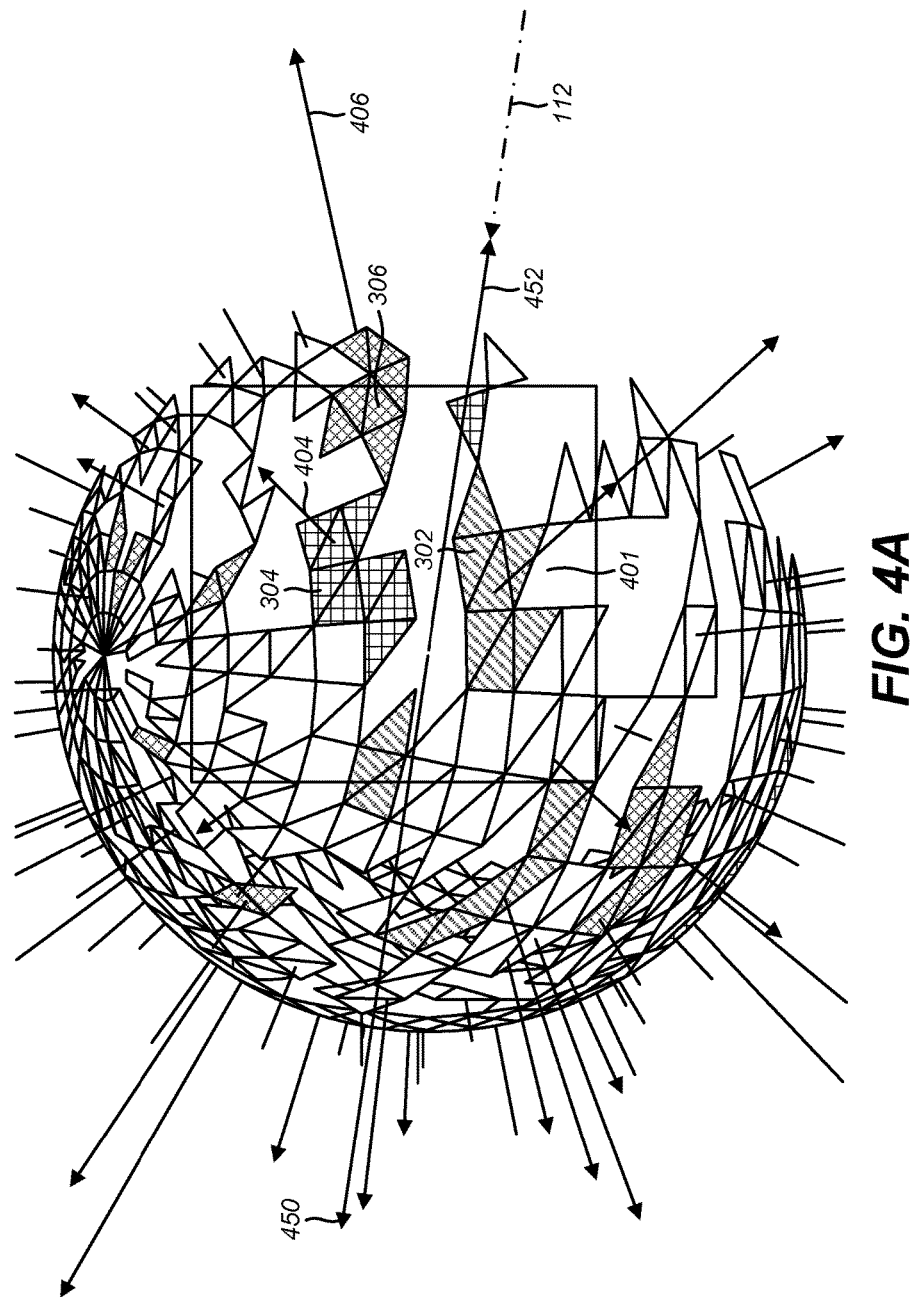
FIGS. 4A and 4B are diagrams illustrating an embodiment of the grouping of the polygons into blotches.
Figure 4B:
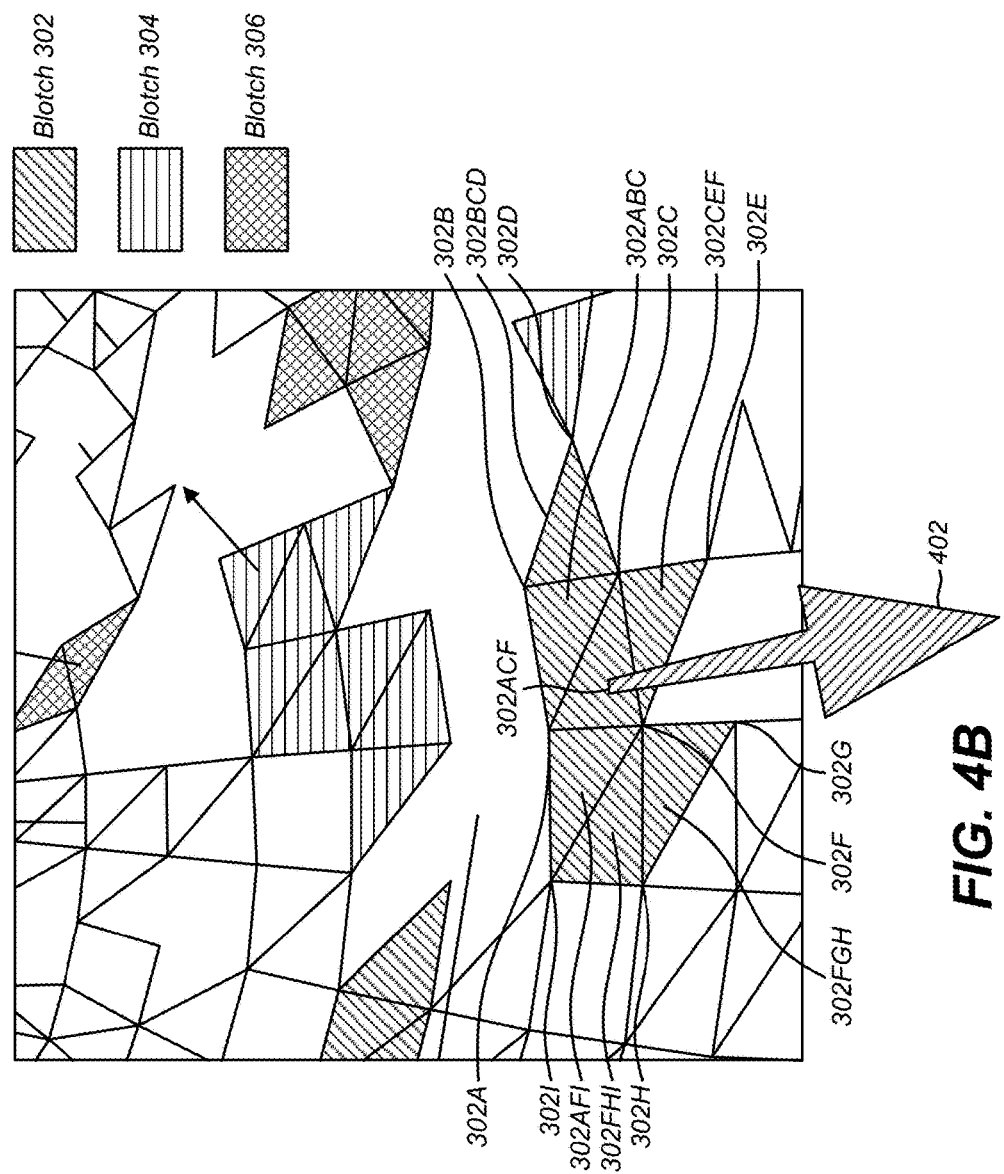

FIGS. 4A and 4B are diagrams illustrating an embodiment of the grouping of the polygons into blotches 302-306 as described above. The portion of FIG. 4A included within window 401 is presented in larger size in FIG. 4B. As illustrated, scan points 302A-302I define polygons (as illustrated, triangles) 302BCD, 302CEF, 302FGH, 302FHI, and 302AFI, which together comprise blotch 302. Note that none of the polygons 302ABC, 302BCD, 302CEF, 302FGH, 302FHI, and 302AFI that together define blotch 304 share a common edge with any of the other blotches 306-308 (although they may share a common scan point with another blotch (e.g. scan points 302D, 302E, 302G, 302H and 302I). Note that all of the blotches have are comprised of at least one polygon.

Figure 5:
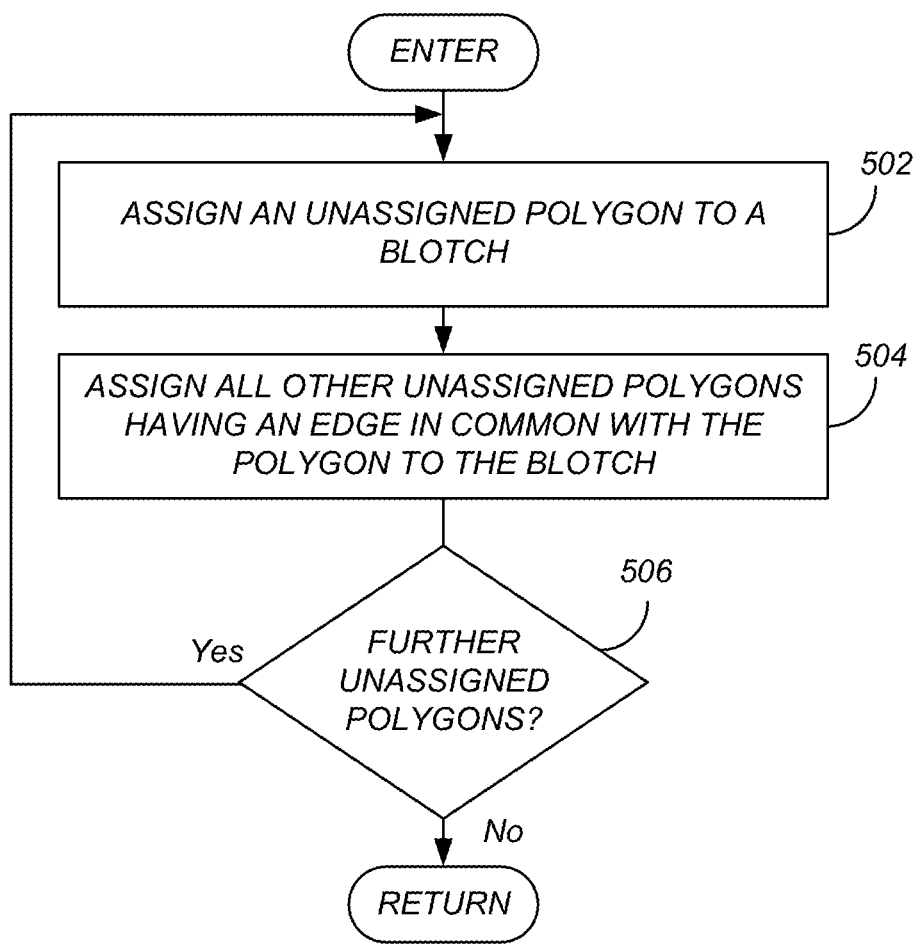
FIG. 5 is a diagram presenting exemplary operations that can be used to group the polygons into blotches that do not share a common edge with any of the other blotches.

FIG. 5 is a diagram presenting exemplary operations that can be used to group the polygons into blotches that do not share a common edge with any of the other blotches. In block 502, a polygon that has not been assigned to a blotch (e.g. unassigned polygon) is assigned to a blotch. In block 504, all other unassigned polygons having an edge in common with the polygon are assigned to the same blotch. For example, referring to FIG. 4B, polygon 302ABC is assigned to blotch 302. All other polygons having an edge in common with polygon 302ABC (e.g. polygons 302BCD and 302ACF) are assigned to the same blotch 302. Then, the edges of these new polygon members of the blotch 302 are examined to determine if they have an edge in common with another polygon. If so, those polygons are designated as members of the blotch 302, with the process repeating until there are no polygons in the blotch 302 that have an edge in common with another polygon.

Returning to FIG. 2, in block 206, a directional vector is computed for each blotch 302, wherein the directional vector for each blotch is weighted by an area of the blotch. For example, referring again to FIG. 4B, a directional vector 402 for blotch 302 is computed, and weighted by the area of blotch 302 (e.g. the sum of the areas of blotch 302's polygons 302ABC, 302BCD, 302CEF, 302FGH, 302FHI, and 302AFI. The directional vector 402 is normal to the surface of the blotch 302 and is weighted according to the area of the blotch 302.

Figure 6:
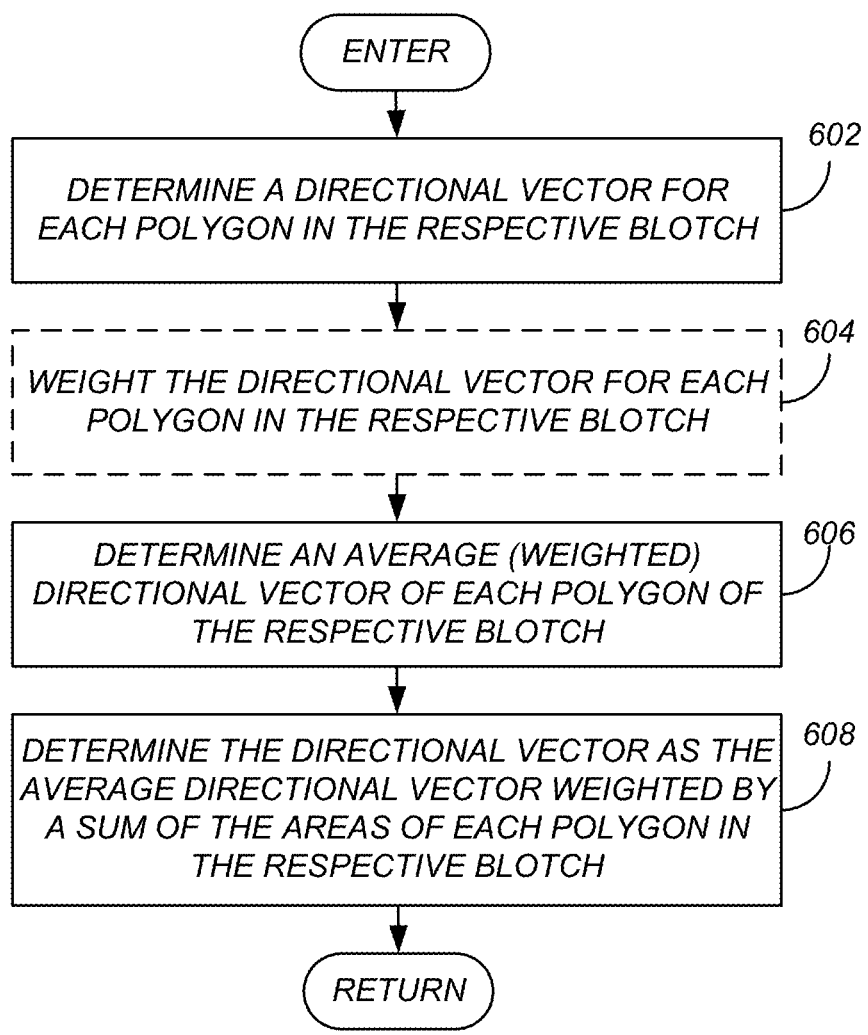
FIG. 6 is a diagram illustrating exemplary method steps for computing the directional vector.

FIG. 6 is a diagram illustrating exemplary method steps for computing the directional vector 402. In block 602, a directional vector for each polygon in the respective blotch is determined. In one embodiment, the origin of the directional vector is in the center of the polygon (e.g. center of mass point at which the polygon would balance if placed on a head of a pin) and extends normally (e.g. perpendicularly) from the polygon.

Figure 7:
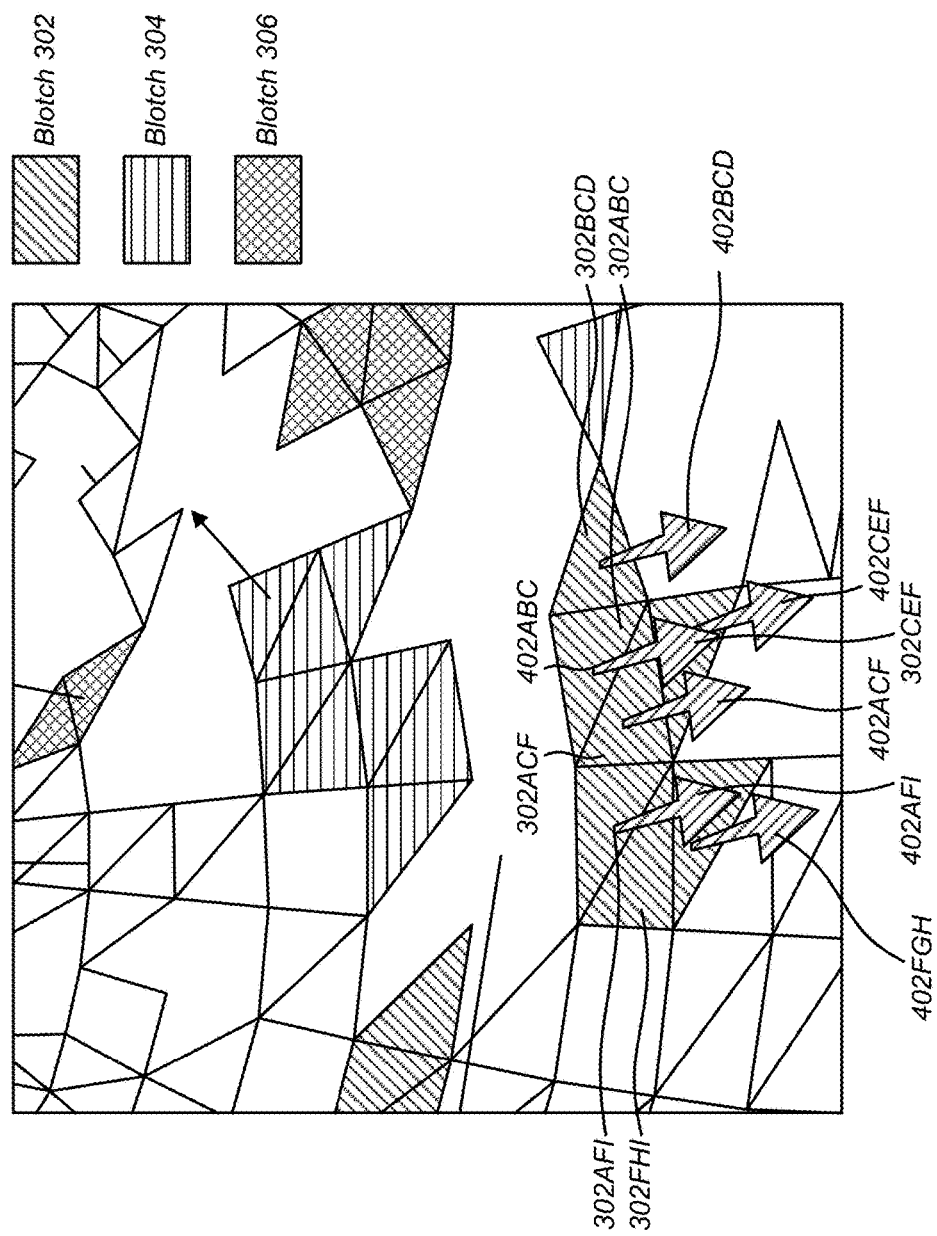
FIG. 7 is a diagram illustrating exemplary directional vectors for each respective polygon.

FIG. 7 is a diagram illustrating exemplary directional vectors 402ABC, 402BCD, 402CEF, 402FGH, 402FHI, and 402AFI for each respective polygon 302ABC, 302BCD, 302CEF, 302FGH, 302FHI, and 302AFI. Returning to FIG. 6, block 604 weights the directional vector of each polygon in the respective blotch 302. In one embodiment for example, each polygon is weighted by the area of the polygon (which may not be of equal area). In block 606, the average (and optionally weighted) directional vector of each polygon in the blotch is determined. Finally, the directional vector for the blotch is determined as the average directional vector weighted by the sum of the areas of each polygon in the respective blotch. The resulting weighted directional vectors 402-406 for respective blotches 302-306 are illustrated in FIG. 4A.

Returning to FIG. 2, block 208 computes a further scan direction from the directional vectors for each of the blotches.

Figure 8:
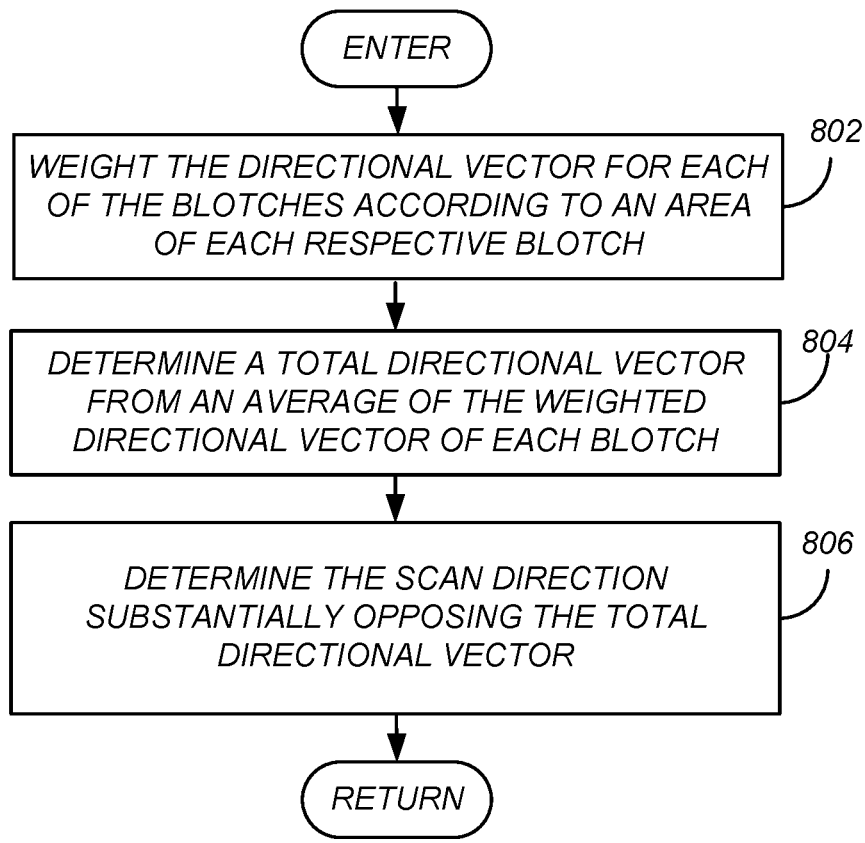
FIG. 8 is a diagram illustrating exemplary operations that can be used to compute the further scan direction from the directional vectors of each of the blotches.

FIG. 8 is a diagram illustrating exemplary operations that can be used to compute the further scan direction from the directional vectors of each of the blotches. In block 802, the directional vector for each blotch is weighted according to the area of the respective blotch. For example, referring to FIG. 4A, blotch 302 has seven triangles of equal area, while blotch 304 has eight triangles of the same equal area. Hence, the directional vector 402 associated with blotch 302 would be weighted less than the directional vector 404 associated with blotch 302.

In block 804, the total directional vector 450 (for all the blotches) is determined from an average of the weighted directional vectors of each blotch. Finally, in block 806, the scan direction for the next scan is determined as a scan direction substantially opposing (e.g. in the opposite direction of) the average (total) directional vector 450 computed in block 804.

Returning to FIG. 2, the scanner 101 is commanded to scan the object 108 3D surface 110 from the scan direction computed in block 806. Block 212 determines if an end condition has been reached. If the end condition has been reached, the scanning process terminates. Otherwise, processing is routed to block 202, where the scan is performed from the newly computed scan direction. Although block 212 is illustrated as being performed after commanding the scanner 101 to obtain additional scan data, the processing of block 212 may follow block 204, thus testing the end condition after each plurality of polygons have been grouped into blotches, and the number of blotches have been determined.

Referring to FIG. 4A, it can be seen that the total directional vector for all of the blotches is a rough indication of areas of the object that have been scanned and scan points determined. The areas without data points or with fewer data points are surface areas of the object which have not been adequately scanned. Areas with data points define polygons which, in turn, define blotches of areas that have been scanned. The foregoing technique identifies a direction that has the least scan points for the next scan, and as the scan points become filled in, the blotches become larger and larger and fewer and fewer in number.

In one embodiment, the foregoing end condition is determined according to the number of blotches remaining after the operations of block 204 have been completed. The number of remaining blotches is determined and if the number of remaining blotches is less than a threshold number of blotches, the end condition is determined to be achieved.

Hardware Environment

Figure 9:
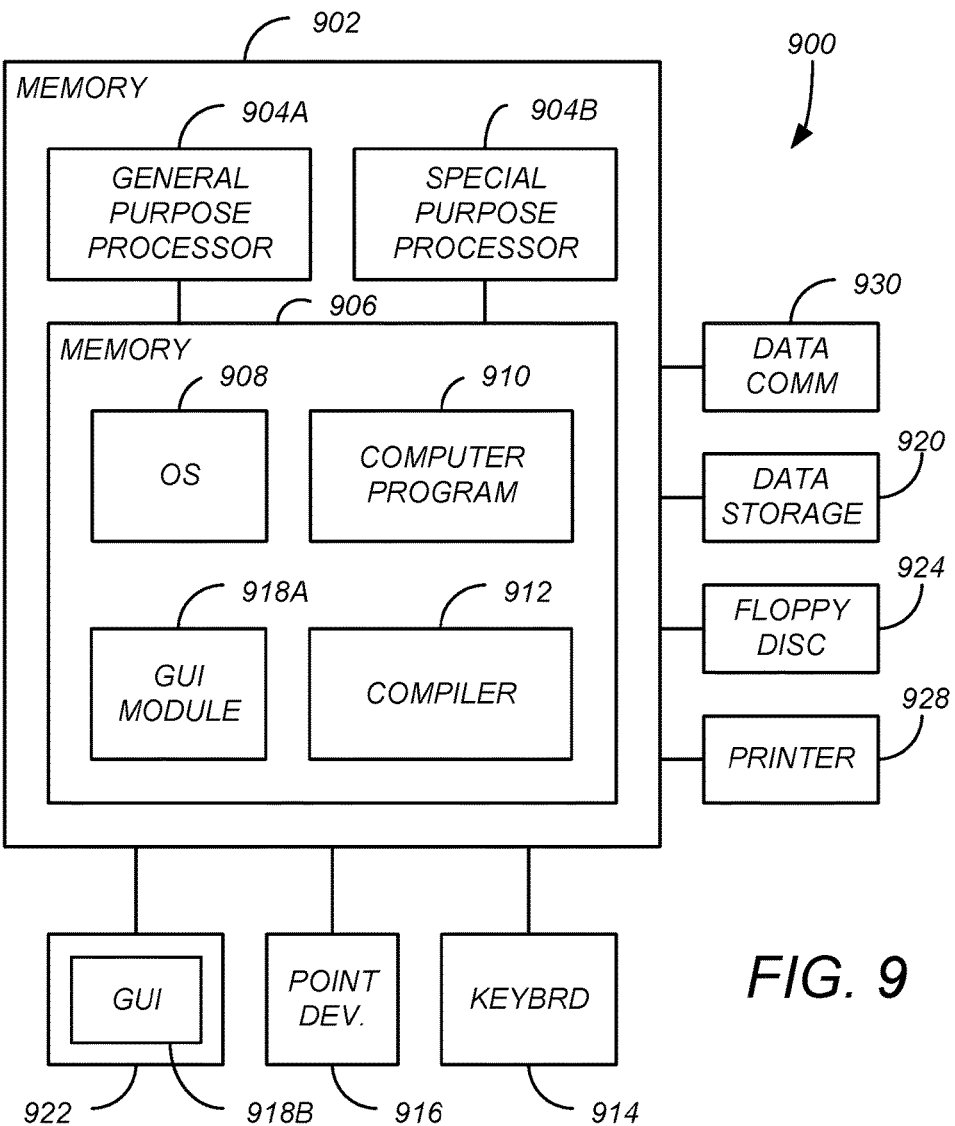
FIG. 9 illustrates an exemplary computer system that could be used to implement processing elements of the above disclosure.

FIG. 9 illustrates an exemplary computer system 900 that could be used to implement processing elements of the above disclosure, including the controller/image processor 106. The computer 902 comprises a processor 904 and a memory, such as random access memory (RAM) 906. The computer 902 is operatively coupled to a display 922, which presents images such as windows to the user on a graphical user interface 918B. The computer 902 may be coupled to other devices, such as a keyboard 914, a mouse device 916, a printer, etc. Of course, those skilled in the art will recognize that any combination of the above components, or any number of different components, peripherals, and other devices, may be used with the computer 902.

Generally, the computer 902 operates under control of an operating system 908 stored in the memory 906, and interfaces with the user to accept inputs and commands and to present results through a graphical user interface (GUI) module 918A. Although the GUI module 918B is depicted as a separate module, the instructions performing the GUI functions can be resident or distributed in the operating system 908, the computer program 910, or implemented with special purpose memory and processors. The computer 902 also implements a compiler 912 which allows an application program 910 written in a programming language such as COBOL, C++, FORTRAN, or other language to be translated into processor 904 readable code. After completion, the application 910 accesses and manipulates data stored in the memory 906 of the computer 902 using the relationships and logic that was generated using the compiler 912. The computer 902 also optionally comprises an external communication device such as a modem, satellite link, Ethernet card, or other device for communicating with other computers.

In one embodiment, instructions implementing the operating system 908, the computer program 910, and the compiler 912 are tangibly embodied in a computer-readable medium, e.g., data storage device 920, which could include one or more fixed or removable data storage devices, such as a zip drive, floppy disc drive 924, hard drive, CD-ROM drive, tape drive, etc. Further, the operating system 908 and the computer program 910 are comprised of instructions which, when read and executed by the computer 902, causes the computer 902 to perform the operations herein described. Computer program 910 and/or operating instructions may also be tangibly embodied in memory 906 and/or data communications devices 930, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of controlling a scanner to scan a three dimensional surface, comprising:
  (a) receiving scan data of the three dimensional surface from the scanner, the scan data comprising a plurality of scan points defining a plurality of polygons and obtained from a scan direction;

(b) grouping the plurality of polygons into blotches having least one polygon, wherein no polygon of a blotch shares a common edge with a polygon of any other blotch;

(c) computing a directional vector for each blotch, the directional vector of each blotch weighted by an area of the blotch;

(d) computing a further scan direction from the directional vectors for the blotches; and (e) commanding the scanner to scan from the further scan direction.

2. The method of claim 1, further comprising:

(f) receiving further scan data;

(g) determining an end condition;

(h) performing (b)-(e) for the further scan data until the end condition is achieved.

3. The method of claim 2, wherein:

determining the end condition comprises determining if a number of blotches is less than a threshold number of blotches; and the method further comprises designating the end condition as achieved if the number of blotches is less than the threshold number of blotches.

4. The method of claim 1, wherein grouping the plurality of polygons into blotches having at least one polygon, wherein no polygon of any blotch shares a common edge with a polygon of any other blotch comprises:

(b1) assigning an unassigned polygon to a blotch;

(b2) assigning all other unassigned polygons having an edge in common with the polygon to the blotch; and (b3) repeating steps (b1)-(b2) for all further unassigned polygons.

5. The method of claim 1, wherein computing a directional vector for each blotch, the directional vector of each blotch weighted by an area of the blotch comprises:

determining a directional vector for each polygon in the respective blotch;

determining an average directional vector of each polygon of the respective blotch;

determining the directional vector as the average directional vector weighted by a sum of the areas of each polygon in the respective blotch.

6. The method of claim 5, wherein:

the method further comprises weighting the directional vector for each polygon in the respective blotch; and determining an average directional vector of each polygon of the respective blotch comprises determining an average directional vector of each weighted directional vector.

7. The method of claim 1, wherein computing a further scan direction from the directional vectors for the blotches comprises:

(d1) weighting the directional vector for each for blotches according to an area of each respective blotch;

(d2) determining a total directional vector from an average of the weighted directional vector of each blotch; and (d3) determining the scan direction opposing the average directional vector.

8. The method of claim 1, wherein the polygons are triangles.

9. An apparatus for scanning a three dimensional surface, comprising:

a sensor;

a controller, having a processor; and a memory, communicatively coupled to the processor, the memory storing instructions including instructions comprising instructions for:

(a) receiving scan data of the three dimensional surface, the scan data comprising a plurality of scan points defining a plurality of polygons and obtained from a scan direction;

(b) grouping the plurality of polygons into blotches having least one polygon, wherein no polygon of a blotch shares a common edge with a polygon of any other blotch;

(c) computing a directional vector for each blotch, the directional vector of each blotch weighted by an area of the blotch;

(d) computing a further scan direction from the directional vectors for the blotches; and (e) commanding a scanner to scan from the further scan direction.

10. The apparatus of claim 9, wherein the instructions further comprise instructions for:

(f) receiving further scan data;

(g) determining an end condition;

(h) performing (b)-(e) for the further scan data until the end condition is achieved.

11. The apparatus of claim 10, wherein:

the instructions for determining the end condition comprise instructions for determining if a number of blotches is less than a threshold number of blotches;

the instructions further comprise designating the end condition as achieved if the number of blotches is less than the threshold number of blotches.

12. The apparatus of claim 9, wherein the instructions for grouping the plurality of polygons into blotches having least one polygon, wherein no polygon of any blotch shares a common edge with a polygon of any other blotch comprise instructions for:

(b1) assigning an unassigned polygon to a blotch;

(b2) assigning all other unassigned polygons having an edge in common with the polygon to the blotch; and (b3) repeating steps (b1)-(b2) for all further unassigned polygons.

13. The apparatus of claim 9, wherein the instructions for computing a directional vector for each blotch, the directional vector of each blotch weighted by an area of the blotch comprise instructions for:

determining a directional vector for each polygon in the respective blotch;

determining an average directional vector of each polygon of the respective blotch;

determining the directional vector as the average directional vector weighted by a sum of the areas of each polygon in the respective blotch.

14. The apparatus of claim 13, wherein:

the instructions further comprise weighting the directional vector for each polygon in the respective blotch; and the instructions for determining an average directional vector of each polygon of the respective blotch comprise instructions for determining an average directional vector of each weighted directional vector.

15. The apparatus of claim 9, wherein the instructions for computing a further scan direction from the directional vectors for the blotches comprise instructions for:

(d1) weighting the directional vector for each for blotches according to an area of each respective blotch;

(d2) determining a total directional vector from an average of the weighted directional vector of each blotch; and (d3) determining the scan direction opposing the average directional vector.

16. The apparatus of claim 9, wherein the polygons are triangles.

17. An apparatus for scanning a three dimensional surface, comprising:
- means for receiving scan data of the three dimensional surface, the scan data comprising a plurality of scan points defining a plurality of polygons and obtained from a scan direction;
- means for grouping the plurality of polygons into blotches having at least one polygon, wherein no polygon of a blotch shares a common edge with a polygon of any other blotch;
- means for computing a directional vector for each blotch, the directional vector of each blotch weighted by an area of the blotch;
- means for computing a further scan direction from the directional vectors for the blotches; and
- means for commanding a scanner to scan from the further scan direction.

18. The apparatus of claim 17, further comprising:
- means for determining an end condition;
- means for terminating the scanning of the three dimensional surface after the end condition is achieved.

19. The apparatus of claim 18, wherein:
- means for determining the end condition comprises determining if a number of blotches is less than a threshold number of blotches; and
- the apparatus further comprises means for designating the end condition as achieved if the number of blotches is less than the threshold number of blotches.

20. The apparatus of claim 17, wherein the means for grouping the plurality of polygons into blotches having at least one polygon, wherein no polygon of any blotch shares a common edge with a polygon of any other blotch comprises:
- means for assigning an unassigned polygon to a blotch;
- means for assigning all other unassigned polygons having an edge in common with the polygon to the blotch; and
- means for repeating the assigning an unassigned polygon to a blotch and assigning all other unassigned polygons having an edge in common with the polygon to the blotch for all further unassigned polygons.

* * * * *